(12) United States Patent
Stoltenberg et al.

(10) Patent No.: US 10,544,483 B2
(45) Date of Patent: Jan. 28, 2020

(54) SCALABLE PROCESSES FOR FORMING TIN NANOPARTICLES, COMPOSITIONS CONTAINING TIN NANOPARTICLES, AND APPLICATIONS UTILIZING SAME

(71) Applicant: LOCKHEED MARTIN CORPORATION, Bethesda, MD (US)

(72) Inventors: Randall M. Stoltenberg, Palo Alto, CA (US); Alfred A. Zinn, Palo Alto, CA (US)

(73) Assignee: Lockheed Martin Corporation, Bethesda, MD (US)

( * ) Notice: Subject to any disclaimer, the term of this patent is extended or adjusted under 35 U.S.C. 154(b) by 134 days.

(21) Appl. No.: 15/201,093

(22) Filed: Jul. 1, 2016

(65) Prior Publication Data
US 2016/0312336 A1    Oct. 27, 2016

Related U.S. Application Data

(60) Division of application No. 13/656,590, filed on Oct. 19, 2012, now abandoned, which is a continuation-in-part of application No. 13/040,207, filed on Mar. 3, 2011, now Pat. No. 8,834,747.

(Continued)

(51) Int. Cl.
| | |
|---|---|
| *C22B 3/00* | (2006.01) |
| *B23K 35/26* | (2006.01) |
| *B22F 1/00* | (2006.01) |
| *B82Y 30/00* | (2011.01) |
| *H05G 2/00* | (2006.01) |

(52) U.S. Cl.
CPC ............ *C22B 25/04* (2013.01); *B23K 35/262* (2013.01); *B22F 1/0018* (2013.01); *B82Y 30/00* (2013.01); *H05G 2/00* (2013.01)

(58) Field of Classification Search
CPC ....................................................... H01B 1/02
See application file for complete search history.

(56) References Cited

U.S. PATENT DOCUMENTS

| | | |
|---|---|---|
| 3,332,916 A | 7/1967 | Hay |
| 3,637,508 A | 1/1972 | Willsey et al. |

(Continued)

FOREIGN PATENT DOCUMENTS

| | | |
|---|---|---|
| EP | 1921176 A2 | 5/2008 |
| JP | 2009006337 A | 1/2009 |

(Continued)

OTHER PUBLICATIONS

Balan, et al., "A new organometallic synthesis of size-controlled tin(0) nanoparticles", Nanotechnology, 2005, pp. 1153-1158, vol. 16.

(Continued)

*Primary Examiner* — William D Young
(74) *Attorney, Agent, or Firm* — Morgan, Lewis & Bockius LLP (57) ABSTRACT

A method includes providing nanoparticles having a tin coating surrounding a metal nucleus, such as copper. The nucleus forms first and acts as a seed growing into nanoparticles with a tin coating and a nucleus. The nanoparticles are at least partially vaporized, thereby producing vaporized tin ions. An emission of extreme ultraviolet (EUV) radiation is generated from the vaporized tin ions.

7 Claims, 6 Drawing Sheets

Related U.S. Application Data (60) Provisional application No. 61/706,722, filed on Sep. 27, 2012, provisional application No. 61/551,391, filed on Oct. 25, 2011, provisional application No. 61/310,533, filed on Mar. 4, 2010.

(56) References Cited

U.S. PATENT DOCUMENTS

| | | |
|---|---|---|
| 3,963,811 A | 6/1976 | Tamura et al. |
| 4,151,015 A | 4/1979 | Cooper |
| 5,127,969 A | 7/1992 | Sekhar |
| 5,147,841 A | 9/1992 | Wilcoxon |
| 5,159,171 A | 10/1992 | Cook et al. |
| 5,252,519 A | 10/1993 | Nakatani et al. |
| 5,800,650 A | 9/1998 | Anderson et al. |
| 5,958,590 A | 9/1999 | Kang et al. |
| 6,143,356 A | 11/2000 | Jablonski |
| 6,645,444 B2 | 11/2003 | Goldstein |
| 6,783,569 B2 | 8/2004 | Cheon et al. |
| 7,306,823 B2 | 12/2007 | Sager et al. |
| 7,419,887 B1 | 9/2008 | Quick et al. |
| 7,442,879 B2 | 10/2008 | Das et al. |
| 7,465,946 B2 * | 12/2008 | Bowering ............. B82Y 10/00 134/1.1 |
| 7,492,867 B1 | 2/2009 | Richardson |
| 7,524,351 B2 | 4/2009 | Hua et al. |
| 7,559,970 B2 | 7/2009 | Kim et al. |
| 7,628,840 B2 | 12/2009 | Atsuki et al. |
| 7,637,982 B2 | 12/2009 | Hou et al. |
| 7,736,414 B1 | 6/2010 | Zinn |
| 7,743,964 B2 | 6/2010 | Maeda |
| 7,847,397 B2 | 12/2010 | Wu et al. |
| 7,850,933 B2 | 12/2010 | Yang et al. |
| 7,858,025 B2 | 12/2010 | Shim et al. |
| 8,834,747 B2 | 9/2014 | Zinn |
| 2002/0079135 A1 | 6/2002 | Yazaki et al. |
| 2003/0100654 A1 | 5/2003 | Chheang et al. |
| 2003/0146019 A1 | 8/2003 | Hirai |
| 2004/0245648 A1 | 12/2004 | Nagasawa et al. |
| 2005/0249967 A1 | 11/2005 | Egli |
| 2006/0001726 A1 | 1/2006 | Kodas et al. |
| 2006/0046447 A1 | 3/2006 | Yamamoto |
| 2006/0068216 A1 | 3/2006 | Hua et al. |
| 2006/0189113 A1 | 8/2006 | Vanheusden et al. |
| 2006/0196579 A1 | 9/2006 | Skipor et al. |
| 2007/0098883 A1 | 5/2007 | Itoh et al. |
| 2007/0202304 A1 | 8/2007 | Golovko et al. |
| 2007/0290175 A1 | 12/2007 | Kim |
| 2007/0298536 A1 | 12/2007 | Ren et al. |
| 2008/0003364 A1 | 1/2008 | Ginley et al. |
| 2008/0011125 A1 | 1/2008 | Shirata et al. |
| 2008/0032132 A1 | 2/2008 | Woodfield et al. |
| 2008/0067456 A1 * | 3/2008 | Kloepfel ............. H05G 2/003 250/504 R |
| 2008/0072706 A1 | 3/2008 | Lee et al. |
| 2008/0124268 A1 | 5/2008 | Yang et al. |
| 2008/0149176 A1 | 6/2008 | Sager et al. |
| 2008/0151515 A1 | 6/2008 | Das et al. |
| 2008/0159902 A1 | 7/2008 | Shim et al. |
| 2008/0160183 A1 | 7/2008 | Ide et al. |
| 2008/0278181 A1 | 11/2008 | Zhong et al. |
| 2008/0286488 A1 | 11/2008 | Li et al. |
| 2009/0029148 A1 | 1/2009 | Hashimoto et al. |
| 2009/0145765 A1 | 6/2009 | Abys et al. |
| 2009/0146117 A1 | 6/2009 | Suenaga et al. |
| 2009/0214764 A1 | 8/2009 | Li et al. |
| 2009/0239073 A1 | 9/2009 | Huang et al. |
| 2009/0285976 A1 | 11/2009 | Lochtman et al. |
| 2009/0301344 A1 | 12/2009 | Chretien et al. |
| 2009/0301606 A1 | 12/2009 | Ueshima |
| 2010/0031848 A1 | 2/2010 | Lee et al. |
| 2010/0065616 A1 | 3/2010 | Zinn |
| 2010/0075137 A1 | 3/2010 | Sinton et al. |
| 2010/0139455 A1 | 6/2010 | Tilley et al. |
| 2010/0200776 A1 * | 8/2010 | Yabu ............. H05G 2/003 250/504 R |
| 2010/0275729 A1 | 11/2010 | Jun et al. |
| 2010/0314578 A1 | 12/2010 | Purdy |
| 2011/0215279 A1 | 9/2011 | Zinn |

FOREIGN PATENT DOCUMENTS

| | | |
|---|---|---|
| JP | 2011177719 A | 9/2011 |
| KR | 20080010691 A | 1/2008 |
| WO | WO-2006/063134 A2 | 6/2006 |
| WO | WO-2008023944 A1 | 2/2008 |
| WO | WO-2009/115643 A2 | 9/2009 |
| WO | WO-2010/036114 A2 | 4/2010 |

OTHER PUBLICATIONS

Balan, et al., "Novel low-temperature synthesis of tin(0) nanoparticles", Materials Letters, 2005, pp. 1080-1084, vol. 59.

Hsu, et al., "Nanostructures of Sn and Their Enhanced, Shape-Dependent Superconducting Properties", Small, 2006, pp. 268-273, vol. 2, No. 2.

Jiang, "Size-Dependent Melting Properties of Tin Nanoparticles", Science Direct, Chemical Physics Letters 429, 2006, pp. 492-496.

Kwon, et al., "Effect of Capping Agents in Tin Nanoparticles on Electrochemical Cycling", Electrochemical and Solid-State Letters, 2006, pp. A34-A38, vol. 9, No. 1.

Wu, et al., "Simple One-Step Synthesis of Uniform Disperse Copper Nanoparticles", Mater. Res. Soc. Symp. Proc. 2005, vol. 879E, pp. Z6.3.1-Z6.3.6.

Yang, et al., "Synthesis and Characterization of Sn/R, Sn/Si-R, and Sn/SiO$_2$ Core/Shell Nanoparticles", Chem. Mater., 2000, pp. 983-988, vol. 12.

Zhao, et al., "Preparation of Tin Nanoparticles by Solution Dispersion", Materials Science and Engineering A, 2003, pp. 405-407, vol. 359, No. 1-2.

Lin et al., The influence of nano-particles on microstructural development at the interface of Sn3.5Ag-solder and Cu-substrate. Int. J. Nanomanufacturing. vol. 1, No. 3, 2007.

European Office Action dated Nov. 22, 2018, from European Patent Application No. 12843779.5, 7 pages.

* cited by examiner

SCALABLE PROCESSES FOR FORMING TIN NANOPARTICLES, COMPOSITIONS CONTAINING TIN NANOPARTICLES, AND APPLICATIONS UTILIZING SAME

CROSS-REFERENCE TO RELATED APPLICATIONS

This application is a divisional of U.S. patent application Ser. No. 13/656,590, filed on Oct. 19, 2012, which claims the benefit of priority under 35 U.S.C. § 119 from U.S. Provisional Patent Applications 61/706,722, filed on Sep. 27, 2012, and 61/551,391, filed on Oct. 25, 2011, each of which is incorporated herein by reference in its entirety. U.S. patent application Ser. No. 13/656,590, in turn, is also a continuation-in-part of U.S. patent application Ser. No. 13/040,207, filed on Mar. 3, 2011 and now issued as U.S. Pat. No. 8,834,747, which claims priority to U.S. Provisional Patent Application 61/310,533, filed on Mar. 4, 2010, each of which is incorporated herein by reference in its entirety.

STATEMENT REGARDING FEDERALLY SPONSORED RESEARCH OR DEVELOPMENT

Not applicable.

FIELD OF THE INVENTION

The present invention generally relates to metal nanoparticles, and, more specifically, to scalable methods for making tin nanoparticles, compositions containing tin nanoparticles, and uses of tin nanoparticles.

BACKGROUND

Although lead has traditionally been used in numerous industrial applications, current regulations have mandated the elimination and/or phase out of lead in most commercial products. These mandates have stimulated new product development based upon lead-free technologies.

Soldering applications, particularly in electronics and vehicle manufacturing, have been heavily impacted by the ban on lead. Numerous alternatives to traditional lead-based solders have been developed (>300), the Sn/Ag/Cu (SAC) system being among the most widely used, but many have exhibited drawbacks that can make them unsuitable for use in certain applications. For example, SAC solder can be unsuitable for extreme environments such as those found in automotive, military, and space vehicles, where long life and reliability are of significant importance. SAC solder has a significantly higher eutectic melting point (m.p. of ~217° C.) than does traditional Sn/Pb solder (m.p. of 183° C. for 63/37 Sn/Pb or 188° C. for 60/40 Sn/Pb), thus limiting its use to substrates that are capable of withstanding its relatively high working temperatures for effective processing (approximately 240° C.-270° C.). Even higher temperatures of approximately 260° C.-300° C. are more typically needed for rework of SAC solder to take place due to formation of high melting phases such as $Ag_3Sn$ and $Cu_6Sn_5$, further increasing the thermal demands of substrates upon which SAC is disposed. The need for high performance, thermally stable substrates for use in conjunction with SAC can significantly impact the cost of consumer products relative to those in which lower quality substrates can be used. In addition, silver is a relatively expensive component of the SAC system, and there is presently insufficient worldwide silver production capacity (22,000 tons/year) to allow total replacement of lead-based solders to take place with this system (90,000 tons/year). Still another limitation of SAC solder is that its high tin content makes it prone to tin whisker formation, which can increase the risk of electrical shorting.

Several compositions containing nanoparticles have also been proposed as replacements for traditional lead-based solders. Metal nanoparticles, particularly those that are about 20 nm or less in size, can exhibit a significant melting point depression over that of the corresponding bulk metal, thereby allowing the nanoparticles to be liquefied at temperatures comparable to those of traditional lead-based and lead-free solder materials. Copper nanoparticles, in particular, have been extensively studied as an alternative solder material. However, copper nanoparticle systems do not allow for easy rework to take place when replacement of failed components becomes necessary. Moreover, scalable processes for reliably producing bulk quantities of metal nanoparticles in a targeted size range are not yet well developed.

In view of the foregoing, nanoparticle compositions and scalable manufacturing processes thereof that address issues associated with current lead-free solder materials would be of substantial benefit in the art. The present invention satisfies the foregoing need and provides related advantages as well.

SUMMARY

In some embodiments, methods for producing tin nanoparticles are described herein. In some embodiments, the methods include combining a tin (II) salt and a metal salt in a solvent, the metal salt being soluble in the solvent and reducible by the tin (II) salt; reducing the metal salt with a first portion of the tin (II) salt to produce a tin (IV) salt and insoluble nanoparticle seeds formed from the metal salt; and reacting the tin (IV) salt, a second portion of the tin (II) salt, or any combination thereof with a reducing agent to form tin nanoparticles having a nucleus formed from a nanoparticle seed.

In some embodiments, compositions including tin nanoparticles are described herein. In some embodiments, the compositions include tin nanoparticles having a nucleus formed from a nanoparticle seed.

In some embodiments, methods for using tin nanoparticles are described herein. In some embodiments, methods for using tin nanoparticles can include providing a composition containing tin nanoparticles, the tin nanoparticles having a nucleus formed from a nanoparticle seed; and at least partially fusing the tin nanoparticles together.

In some embodiments, methods for using tin nanoparticles can include providing tin nanoparticles; at least partially vaporizing the tin nanoparticles, thereby producing vaporized tin ions; and generating an emission of extreme ultraviolet (EUV) radiation from the vaporized tin ions.

The foregoing has outlined rather broadly the features of the present disclosure in order that the detailed description that follows can be better understood. Additional features and advantages of the disclosure will be described hereinafter. These and other advantages and features will become more apparent from the following description taken in conjunction with the drawings.

BRIEF DESCRIPTION OF THE DRAWINGS

For a more complete understanding of the present disclosure, and the advantages thereof, reference is now made to the following descriptions to be taken in conjunction with the accompanying drawings describing specific embodiments of the disclosure, wherein.

DETAILED DESCRIPTION

The present disclosure is directed, in part, to methods for producing tin nanoparticles. The present disclosure is also directed, in part, to compositions containing tin nanoparticles. The present disclosure is also directed, in part, to applications utilizing tin nanoparticles and to articles containing tin nanoparticles.

Compared to many other metal nanoparticles, tin nanoparticles can display a number of advantages in a variety of applications, especially in soldering techniques. Some of these advantages and applications are discussed herein. A leading advantage of tin nanoparticles in soldering applications is their low fusion temperature and rework temperature. As used herein, the term "fusion temperature" refers to the temperature at which metal nanoparticles liquefy, giving the appearance of melting. As discussed above, metal nanoparticles, including tin nanoparticles, can have fusion temperatures that are much lower than that of the melting point of the corresponding bulk metal. After metal nanoparticles have been at least partially liquefied at or above their fusion temperature, their size can increase due to nanoparticle coalescence, and their fusion temperature can approach that of the melting point of the bulk metal. In the case of high melting point metals such as copper, for example, the intrinsic melting point of the bulk metal (e.g., m.p.=1083° C. for bulk copper) can make it difficult to re-liquefy coalesced metal nanoparticles so that rework can take place. Tin, in contrast, is a low melting metal (m.p.=232° C.). Accordingly, tin nanoparticles can benefit from both low fusion temperatures (e.g., about 200° C. or less) and rework temperatures that are not excessively high and fall at or near the range used for common lead-free solders, including SAC solder. The low temperatures at which tin nanoparticles can be liquefied and reworked can beneficially allow them to be used in combination with low quality substrates that are not especially resistant to thermal stress.

As a solder replacement, tin nanoparticles can also be economically advantageous over other lead-free solder replacements, since tin is abundant and relative inexpensive. Table 1 summarizes the costs of tin in comparison to other common elements used in lead-free solder replacements.

TABLE 1

Abundance and Cost of Selected Metals[1]

| Metal | World Production (tons) | World Reserve (tons) | Cost per Pound |
|---|---|---|---|
| zinc | 12,000,000 | 250,000,000 | $1.10 |
| tin | 260,000 | 5,200,000 | $13.80 |
| copper | 15,900,000 | >3,000,000,000 | $4.50 |
| antimony | 140,000 | 1,800,000 | $6.40 |
| silver | 22,000 | 510,000 | $459.10 |
| bismuth | 7,600 | 320,000 | $9.50 |
| indium | 570 | n/a[2] | $260.10 |
| gallium | 106 | n/a[2] | $295.20 |

[1]USGS data
[2]n/a = not available

Although pristine tin nanoparticles can be susceptible to tin whisker formation, much like bulk tin, various additives can be combined with tin nanoparticles that maintain or enhance the desirable properties noted above while suppressing tin whisker formation. For example, in some embodiments, small amounts of nickel and/or cobalt particles can be added to tin nanoparticles to serve as a whisker suppressant. Although the nickel and/or cobalt particles can be in nanoparticle form, bulk nickel and/or cobalt particles can also be used, with only the tin nanoparticles becoming liquefied during use. The nickel and/or cobalt particles, in contrast, can remain dispersed in solid form within the liquefied tin and continue to exert whisker suppression effects therein. Moreover, since the nickel and/or cobalt particles need not necessarily be liquefied, the formation of multi-element phases and alloys can be desirably avoided. In a like manner, conductive particles, such as copper particles, for example, can also be included with the tin nanoparticles to improve their electrical and/or thermal conductivity. As with the nickel and/or cobalt particles, the copper particles need not necessarily be in nanoparticle form and can exert their desirable effects without necessarily becoming liquefied during use. The ability to suppress tin whisker formation and promote electrical conductivity can allow compositions containing tin nanoparticles to be used in a variety of applications, including printed circuit boards and other electronic devices, for example, where tin whisker formation is undesirable. A further advantage of tin nanoparticles in this regard is that the whisker suppressant can be incorporated during or after the synthesis of the tin nanoparticles, thereby forming solid solutions or alloys at the nanoparticle level.

A further advantage of tin nanoparticles is that their small size can allow the tin nanoparticles to be vaporized (e.g., via laser desorption) and produce a high percentage of vaporized tin ions. The vaporized tin ions can be used to produce an emission of extreme ultraviolet (EUV) radiation, as discussed hereinbelow, which can be utilized in lithographic etching techniques. When generating EUV radiation from vaporized tin ions, having as low as possible an amount of non-ionized tin in the vapor is desirable, and current techniques utilizing bulk tin are deficient in this regard. In contrast, the high percentage of surface atoms in tin nanoparticles allow the amount of non-ionized tin to be minimized to better promote the formation of EUV radiation.

Techniques for synthesizing tin nanoparticles are described in commonly owned U.S. Pat. No. 8,192,866, filed Mar. 3, 2009, and U.S. patent application Ser. No. 13/040, 207, filed Mar. 3, 2011, each of which is incorporated herein by reference in its entirety. Any of the applications described herein can utilize tin nanoparticles prepared according to the techniques set forth in these references. In the present disclosure, significant improvements in the syntheses of tin nanoparticles are described that can improve yields, increase tin nanoparticle stability, and better promote the formation of tin nanoparticles of a desired size. More specifically, the tin nanoparticle syntheses described herein allow nanoparticle nucleation and growth steps to be separated from one another, thereby allowing better control over the tin nanoparticle size distribution to be realized. Greater control over the tin nanoparticle size distribution, in turn, can allow the physical and chemical properties of the tin nanoparticles to be more readily tuned to meet the needs of a particular application in which the nanoparticles are used. In addition, the techniques described herein can better facilitate industrial scale manufacturing while retaining easy control over materials quality.

More specifically, the methods described herein can produce tin nanoparticles in good yields that have a size of about 25 nm or below, particularly with a size of about 10 nm or below, or more particularly with a size of about 5 nm or below. By separating the nanoparticle nucleation and growth processes, the methods described herein can be made more amenable to commercial scale tin nanoparticle production (e.g., hundred to thousands of liters and higher) than are prior processes. In prior tin nanoparticle synthetic processes, nanoparticle nucleation and growth can compete with one another, such that new nanoparticles are continually being formed while previously formed nanoparticles continue to grow in size. When nucleation and growth processes compete in this manner, wide nanoparticle size distributions can sometimes be obtained. Although prior tin nanoparticle syntheses can control the nanoparticle size distribution to some degree through careful moderation of the nucleation and growth processes, such control can become considerably more difficult as the reaction scale becomes large enough to support commercial scale production. Factors leading to loss of process control can include, for example, temperature fluctuations, mixing gradients, non-uniform nucleation site distribution, local supersaturation effects, and the like.

In some embodiments, tin nanoparticles can be synthesized by separating nanoparticle nucleation and growth through an extension of the methods for synthesizing copper nanoparticles described in commonly owned U.S. patent application Ser. No. 13/228,411, filed Sep. 8, 2011 and incorporated herein by reference in its entirety. Namely, through using a tin salt in place of a copper salt, tin nanoparticles can be synthesized by reducing an insoluble tin complex having a narrow size distribution in the nanoparticle size range that is formed in the presence of a tailored mixture of surfactants. Both tin (II) and tin (IV) salts can be used for this purpose. A brief description of techniques for separating tin nanoparticle nucleation and growth in the foregoing manner and the advantages thereof is provided hereinbelow. One perceived advantage of synthesizing tin nanoparticles by reducing an insoluble tin complex is that foreign nucleating agents are not introduced into the core of the tin nanoparticles, thereby allowing the tin nanoparticles to remain pristine without having their properties significantly altered by the foreign nucleating agent. Moreover, these methods do not necessitate the targeted production of a foreign nucleating agent having a desired size, which can represent a particularly challenging task in the nano-regime.

In contrast to the methods described above, in which an insoluble tin complex of a desired size range is reduced to form tin nanoparticles, other embodiments of the present disclosure make use of nanoparticle seeds (i.e., a foreign nucleating agent) about which tin nanoparticles can be formed. More specifically, these methods can employ an internal oxidation-reduction reaction that takes place between two metal salts, a tin (II) salt and a soluble metal salt that is reducible by tin (II) to form an insoluble metal compound. The insoluble metal compound can, in turn, serve as a template upon which tin nanoparticles can be grown during subsequent reduction of the tin (II) salt and/or the tin (IV) salt formed through the internal oxidation-reduction. Ideally, the insoluble metal compound either is produced initially in metallic form (i.e., an oxidation state of 0) or is reducible to a metallic form upon forming tin nanoparticles. Growing tin nanoparticles in this manner again allows the nucleation and growth processes to be effectively separated. Although this approach produces a hybrid nanoparticle having a nucleus that differs from a nanotin coating surrounding it, it is believed that the nucleus only marginally changes the properties of the tin nanoparticles, since it constitutes but a small fraction of the overall tin nanoparticle volume. Moreover, since the nucleus is surrounded by the nanotin coating, it is believed that the nucleus is prevented from altering the chemical reactivity of the tin nanoparticles.

In more specific embodiments, the foregoing techniques for synthesizing tin nanoparticles can make use of the internal oxidation-reduction reaction that occurs between tin (II) and copper (II). Both tin (II) and copper (II) salts are soluble in a wide range of solvents. Tin (II) readily reduces copper (II) to form tin (IV) and copper (I) ions. Unlike copper (II) salts, most copper (I) salts are extremely insoluble in common solvents, and the copper (I) ions can precipitate as a very finely divided solid or sol that does not readily settle. The tin (IV) ions produced by oxidation can, in contrast, remain soluble. Subsequent reduction of the remaining tin (II) and/or tin (IV) ions in the presence of the insoluble copper (I) ions can lead to tin nanoparticle formation about the insoluble copper (I) nanoparticle seed, where the copper nanoparticle seed can be converted to metallic copper during reduction. The reactions associated with forming tin nanoparticles in this manner are summarized in Formulas (1-3). In Formula (3), designation of the $Cu_{nano}$ in parentheses indicates that it forms the nucleus of the tin nanoparticles so obtained.

$$Sn^{2+} \rightarrow Sn^{4+} + 2e^- \qquad \text{Formula (1)}$$

$$2Cu^{2+} + 2e^- \rightarrow Cu^+_{nano} \qquad \text{Formula (2)}$$

$$Sn^{2+}/Sn^{4+} + \text{reducing agent} + Cu^+_{nano} \rightarrow Sn_{nano}(Cu_{nano}) \qquad \text{Formula (3)}$$

Figure 1:
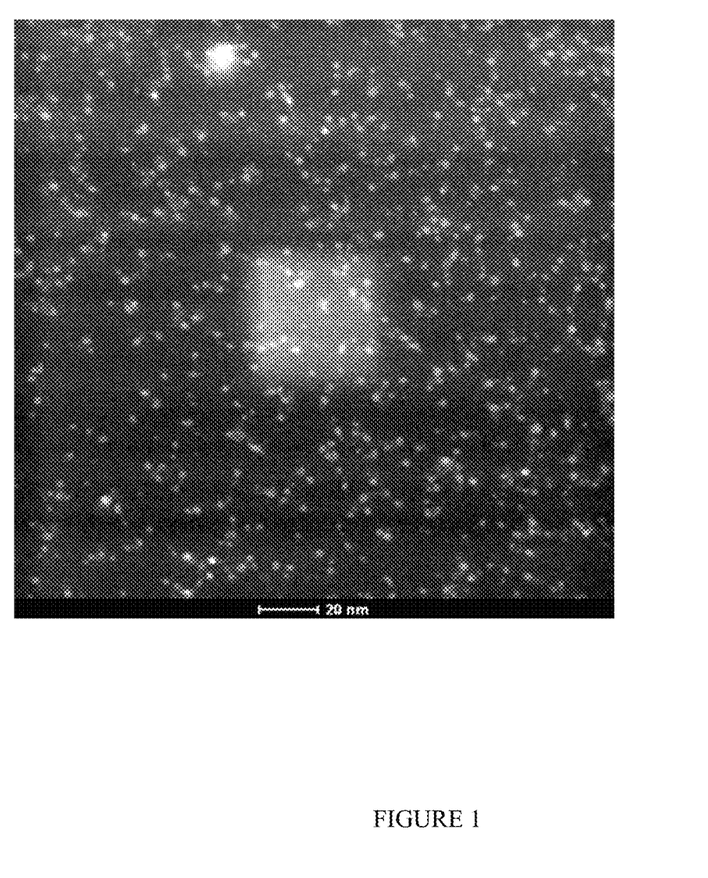
FIG. 1 shows an illustrative STEM image on a gold TEM grid of copper (I) chloride nanoparticle seeds prepared via reduction of a copper (II) salt.

FIG. 1 shows an illustrative STEM image on a gold TEM grid of copper (I) chloride nanoparticle seeds prepared via reduction of a copper (II) salt. The nanoparticle seeds have a size ranging between 3-6 nm in size.

In general, any metal salt that can be reduced to an insoluble form via reduction with tin (II) can be used in the embodiments described herein. In some embodiments, the metal salt forming the insoluble nanoparticle seeds can have a metal oxidation state of +1 or above after being reduced by the tin (II). As discussed above, the reduction of copper (II) to copper (I) represents an illustrative example. Other metal ions that can form insoluble metal salts that may function as nanoparticle seeds following reduction with tin (II) include, for example iron (II). In particular, iron (II) nanoparticle seeds can be produced by reduction of iron (III) in a solvent like triglyme. In other embodiments, the metal salt forming the insoluble nanoparticle seeds can produce a metal oxidation state of 0 after being reduced by the tin (II). Illustrative examples of metal ions that can be reduced to insoluble nanoparticle seeds in the foregoing manner include, for example, gold and silver ions, for example. Compared to copper and iron, however, the latter metals are extremely expensive and not well suited for large scale production as a result.

Copper (I) nanoparticle seeds can also be generated from basic copper solutions stabilized with ammonia, citrate, or tartrate, for example. The addition of sugars or other readily oxidizable compounds, particularly those that contain one or more aldehyde functional groups, can reduce copper (II) to insoluble $Cu_2O$ that precipitates as a very fine yellow material that then turns red. The $Cu_2O$ so formed can be used in the formation of metal nanoparticles in a like manner to that described above for CuCl and other insoluble copper (I) salts. The reaction to produce $Cu_2O$ in the foregoing manner is shown in Formula 4.

$$2Cu(OH)_2 + C_6H_{12}O_6 \rightarrow Cu_2O_{nano} + C_6H_{12}O_7 + 2H_2O \quad \text{(Formula 4)}$$

Moreover, in addition to tin (II) salts, other oxidizable metal salts can also react with copper (II) to produce copper (I) nanoparticle seeds. Illustrative oxidizable metal salts that can be used in this regard include, for example, $Fe^{2+}$ salts, $Ti^{3+}$ salts, $Ce^{3+}$ salts, and the like. The reactions of these ions as their chloride salts are set forth in Formulas (5)-(7).

$$CuCl_2 + FeCl_2 \rightarrow FeCl_3 + CuCl_{nano} \quad \text{(Formula 5)}$$

$$CuCl_2 + TiCl_3 \rightarrow TiCl_4 + CuCl_{nano} \quad \text{(Formula 6)}$$

$$CuCl_2 + CeCl_3 \rightarrow CeCl_4 + CuCl_{nano} \quad \text{(Formula 7)}$$

Thus, in alternative configurations of the methods described herein, a tin salt can be supplied to nanoparticle seeds that have been formed without using a tin salt for their formation (e.g., as formed using Formulas 4-7). Although such syntheses can be used in the spirit and scope of the present disclosure, these techniques can be more difficult to perform and present an opportunity to introduce unwanted metal contamination into the tin nanoparticles.

As used herein, the terms "fuse," "fused" or "fusion" refer to a coalescence or partial coalescence between two or more nanoparticles.

As used herein, the term "nanoparticles" refers to particles having a size of about 100 nm or less in equivalent spherical diameter, although nanoparticles need not necessarily be spherical in shape.

As used herein, the term "whisker suppressant" refers to a substance that inhibits or substantially minimizes the formation of tin whiskers in compositions containing tin.

As used herein, the term "tin whiskers" refers to electrically conductive, crystalline structures of tin that sometimes grow from tin surfaces.

As used herein, the term "size range" refers to the distribution of nanoparticle sizes in a plurality of nanoparticles, such that >95% of the nanoparticles have a size residing within the indicated size range.

As used herein, the term "average size" refers to the arithmetic mean of the distribution of nanoparticle sizes in a plurality of nanoparticles.

As used herein, the term "maximum size" refers to the largest nanoparticle size in a plurality of nanoparticles.

As used herein, the term "organic solvent" generally refers to polar aprotic organic solvents. Useful organic solvents of the embodiments described herein are capable of solubilizing tin salts and/or reducing agents or acting as co-solvents to solubilize tin salts and/or reducing agents.

In some embodiments, compositions containing tin nanoparticles are described herein. In some embodiments, the tin nanoparticles can have a tin coating disposed about a nucleus, where the nucleus is formed from an insoluble nanoparticle seed. In some embodiments, the nucleus can contain a metal that is different than tin. In some embodiments, tin nanoparticles can contain a nucleus having a metal that is different than tin and is maintained in an oxidation state of zero. In other embodiments, tin nanoparticles can contain a nucleus having a metal that is different than tin and is maintained in an oxidation state of +1 or above.

In some embodiments, the tin nanoparticles can contain a nucleus formed from a copper (I) salt and a tin coating surrounding the nucleus. When forming the tin coating around the nucleus, the copper (I) salt can react with a reducing agent to form a metallic state. In other embodiments, the tin nanoparticles can contain a silver (0) nucleus and a tin coating surrounding the nucleus. In still other embodiments, the tin nanoparticles can contain a gold (0) nucleus and a tin coating surrounding the nucleus. In the latter embodiments, the nanoparticle seeds already exist in a metallic state before disposing the tin coating thereon.

In some embodiments, the tin nanoparticles can be about 25 nm or less in size, or about 10 nm or less in size, or about 5 nm or less in size. In some embodiments, the tin nanoparticles can range between about 0.1 nm and about 25 nm in size, or between about 0.5 nm and about 5 nm in size, or between about 0.5 nm and about 7 nm in size, or between about 1 nm and about 7 nm in size, or between about 1 nm and about 10 nm in size, or between about 5 nm and about 20 nm in size. In some embodiments, the tin nanoparticles can range between about 0.5 nm and about 6 nm in size, or between about 1 nm to about 6 nm in size, or between about 3 nm and about 6 nm in size, or between about 3 nm and about 5 nm in size, or between about 2 nm and about 6 nm in size.

In some embodiments, mixtures of tin nanoparticles having different size distributions can be used in the compositions described herein. Specifically, in some embodiments, mixtures of tin nanoparticles can have a first plurality of tin nanoparticles having a first size range and a first average size and a second plurality of tin nanoparticles having a second size range and a second average size. In some embodiments, the mixture of tin nanoparticles can have a bimodal size distribution. For example, in some embodiments, tin nanoparticles having sizes ranging between about 0.5 nm and about 5 nm can be mixed with tin nanoparticles having sizes ranging between about 10 nm and about 25 nm. Given the benefit of the present disclosure, one of ordinary skill in the art will be able to determine whether a single population of tin nanoparticles or mixture of tin nanoparticles is best suited for a given application. For example, a mixture of tin nanoparticles having different fusion temperatures can be used when it is desired to liquefy only a portion of the tin nanoparticles.

Figure 2:
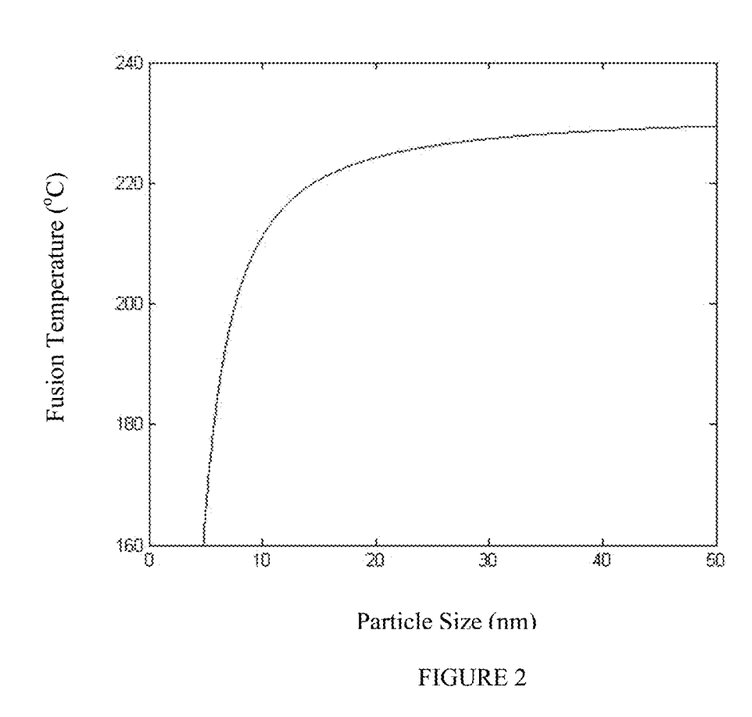
FIG. 2 shows a plot illustrating the predicted fusion temperature of tin nanoparticles as a function of size.

FIG. 2 shows a plot illustrating the predicted fusion temperature of tin nanoparticles as a function of size (see Jiang, et al. "Size-dependent melting properties of tin nanoparticles," *Chem. Phys. Lett.*, 429:2006, pp. 492-496). As illustrated in FIG. 2, smaller tin nanoparticles have a lower fusion temperature than do larger tin nanoparticles. Below about 25 nm in size, and especially below about 10 nm in size, the fusion temperature of tin nanoparticles drops very rapidly. In some embodiments, the tin nanoparticles described herein can have a fusion temperature of about 225° C. or below. In other embodiments, the tin nanoparticles can have a fusion temperature of about 210° C. or below, or about 200° C. or below, or about 180° C. or below, or about 160° C. or below. As described above, these low fusion temperatures make the tin nanoparticles desirable for a number of applications, including soldering applications.

In some embodiments, at least one surfactant can be associated with the tin nanoparticles described herein. As used herein, the terms "associate," "associated," "association" and related variants thereof refer to a chemical or physical bond between a surfactant molecule and tin nanoparticles, particularly the surface of tin nanoparticles. In some embodiments, one or more surfactants can be coordinated through a covalent bond to the surface of the tin nanoparticles. The one or more surfactants can be included during the synthesis of the tin nanoparticles to result in their stabilization. Among other features, stabilization of the tin nanoparticles using one or more surfactants can include, for example, preventing or limiting agglomeration of the tin nanoparticles, controlling the size of the tin nanoparticles, protecting the surface of the tin nanoparticles from oxidation, or any combination thereof. In some embodiments, two or more surfactants can be associated with the tin nanoparticles. In some embodiments, three of more surfactants can be associated with the tin nanopartices. Further discussion of suitable surfactants and benefits of using multiple surfactants in combination with one another will be discussed hereinbelow.

Figure 3:
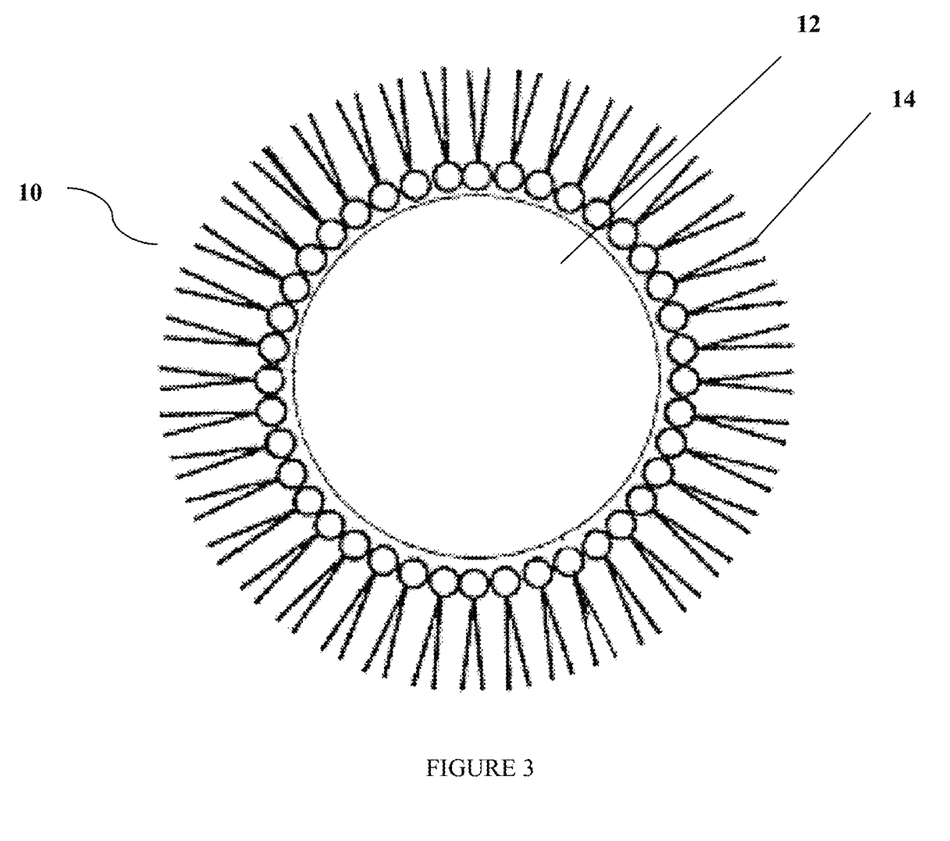
FIG. 3 shows a presumed structure of tin nanoparticles prepared by reducing an insoluble tin complex.

Without being bound by any theory or mechanism, FIG. 3 shows a presumed structure of tin nanoparticles prepared by reducing an insoluble tin complex. As shown in FIG. 3, tin nanoparticle 10 includes metallic core 12 and surfactant layer 14 overcoating metallic core 12. Surfactant layer 14 can contain any combination of surfactants. Among other features, surfactant layer 14 can reduce the likelihood of the tin nanoparticles agglomerating with one another.

Figure 4:
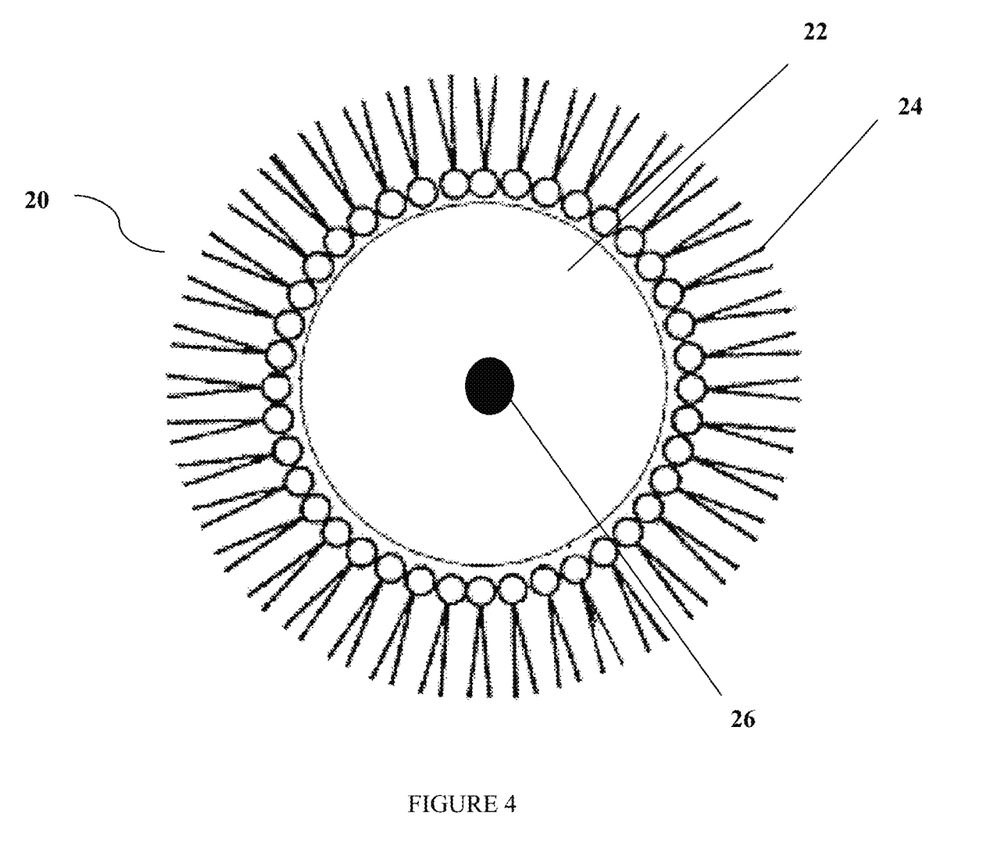
FIG. 4 shows a presumed structure of tin nanoparticles grown about an insoluble nanoparticle seed.

Again without being bound by any theory or mechanism, FIG. 4 shows a presumed structure of tin nanoparticles grown about an insoluble nanoparticle seed. Like tin nanoparticles prepared by reducing an insoluble tin complex, tin nanoparticle 20 includes metallic core 22 and surfactant layer 24 overcoating metallic core 22. Unlike tin nanoparticle 10, depicted in FIG. 3, tin nanoparticle 20 also includes nucleus 26 located within metallic core 22. As described above, nucleus 26 can promote the deposition of metallic core 22 thereon. Nucleus 26 can be formed from a metal that is different than tin.

In some embodiments, a combination of amine surfactants, particularly aliphatic amines, can be used during the synthesis of tin nanoparticles and become associated therewith. In some embodiments, two amine surfactants can be used in combination with one another. In other embodiments, three amine surfactants can be used in combination with one another. In more specific embodiments, a primary amine, a secondary amine, and a diamine chelating agent can be used in combination with one another. In still more specific embodiments, the three amine surfactants can include a long chain primary amine, a secondary amine, and a diamine having at least one tertiary alkyl group nitrogen substituent. Further disclosure regarding suitable amine surfactants follows hereinafter.

Since tin is a main group element, its association with aliphatic amine surfactants is weaker than with transition metals. Without being bound by theory or mechanism, it is believed that the weaker interaction of aliphatic amine surfactants is due to the softness of the tin ions. Accordingly, aliphatic amine surfactants may provide less stabilization for tin nanoparticles than for comparable transition metal nanoparticles (e.g., copper nanoparticles). The weaker association of aliphatic amine surfactants with tin nanoparticles can make it desirable, in some embodiments, to utilize one or more surfactants that are more compatible with softer metal centers. Illustrative surfactants that can be used in this regard include, for example, pyridines, aromatic amines, phosphines, thiols, and any combination thereof. In some embodiments, at least one surfactant that includes a pyridine, an aromatic amine, a phosphine, a thiol, or any combination thereof can be associated with the tin nanoparticles. In some embodiments, any of these surfactants or any combination thereof can be used in combination with one or more aliphatic amine surfactants. In some embodiments, an aliphatic amine can be used in combination with a phosphine and a thiol. In other embodiments, the one or more surfactants associated with the tin nanoparticles can lack an aliphatic amine. Further disclosure regarding suitable pyridines, aromatic amines, phosphines, and thiols follows below. As one of ordinary skill in the art will recognize, the choice of suitable surfactants may depend, at least in part, upon the solvent in which the tin nanoparticles are being formed. Solvents such as glyme solvents, for example, present few restrictions, whereas fewer surfactants are soluble in aqueous solvents.

In some embodiments, the overall stoichiometric ratio of surfactants to tin can range between about 1:1 to about 2:1.

In some embodiments, the at least one surfactant can include a primary alkylamine. In some embodiments, the primary alkylamine can be a C2-C18 alkylamine. In some embodiments, the primary alkylamine can be a C7-C10 alkylamine. In other embodiments, a C5-C6 primary alkylamine can also be used. Without being bound by theory or mechanism, the exact size of the primary alkylamine can be balanced between being long enough to provide an effective inverse micelle structure versus having ready volatility and/or ease of handling. For example, primary alkylamines with more than 18 carbons can also be suitable for use in the present embodiments, but they can be more difficult to handle because of their waxy character. C7-C10 primary alkylamines, in particular, can represent a good balance of desired properties for ease of use.

In some embodiments, the C4-C18 primary alkylamine can be n-heptylamine, n-octylamine, n-nonylamine, or n-decylamine, for example. While these are all straight chain primary alkylamines, branched chain primary alkylamines can also be used in other embodiments. For example, branched chain primary alkylamines such as, for example, 7-methyloctylamine, 2-methyloctylamine, or 7-methylnonylamine can be used. In some embodiments, such branched chain primary alkylamines can be sterically hindered where they are attached to the amine nitrogen atom. Non-limiting examples of such sterically hindered primary alkylamines can include, for example, t-octylamine, 2-methylpentan-2-amine, 2-methylhexan-2-amine, 2-methylheptan-2-amine, 3-ethyloctan-3-amine, 3-ethylheptan-3-amine, 3-ethylhexan-3-amine, and the like. Additional branching can also be present. Without being bound by any theory or mechanism, it is believed that primary alkylamines can serve as ligands in the coordination sphere of tin. Due to their single point of attachment and the softness of tin, they are believed to be readily dissociable from the tin center. Further, for primary alkylamines having significant steric hinderance, the bulky groups near the amine nitrogen can further reduce the bonding strength and facilitate dissociation from the tin center.

In some embodiments, the at least one surfactant can include a secondary amine. Secondary amines suitable for use in the present embodiments can include normal, branched, or cyclic C4-C12 alkyl groups bound to the amine nitrogen atom. In some embodiments, the branching can occur on a carbon atom bound to the amine nitrogen atom, thereby producing significant steric encumbrance at the nitrogen atom. Secondary amines that can be associated with tin nanoparticles can include, without limitation, dihexylamine, diisobutylamine, di-t-butylamine, dineopentylamine, di-t-pentylamine, dicyclopentylamine, dicycylohexylamine, and the like. It should also be noted that secondary amines outside the C4-C12 range can also be used, but such secondary amines can have undesirable physical properties such as low boiling points or waxy consistencies that complicate their handling. Without being bound by any theory or mechanism, it is believed that secondary amines can more strongly coordinate to tin due to their higher basicity, although the bonding strength can be tempered when the secondary amine is sterically encumbered. Remaining unbound by any theory or mechanism, it is believed that secondary amines can particularly facilitate the dissolution of tin salts in an organic solvent.

In some embodiments, the at least one surfactant can include a chelating agent, particularly a diamine chelating agent. In some embodiments, one or both of the nitrogen atoms of the diamine chelating agent can be substituted with one or two alkyl groups. When two alkyl groups are present on the same nitrogen atom, they can be the same or different. Further, when both nitrogen atoms are substituted, the same or different alkyl groups can be present. In some embodiments, the alkyl groups can be C1-C6 alkyl groups. In other embodiments, the alkyl groups can be C1-C4 alkyl groups or C3-C6 alkyl groups. In some embodiments, C3 or higher alkyl groups can be straight or have branched chains. In some embodiments, C3 or higher alkyl groups can be cyclic. Without being bound by theory or mechanism, it is believed that diamine chelating agents can coordinate a tin center at two locations and stabilize the formation of tin nanoparticles. Formation of a tin chelate can result in the diamine chelating agent being more strongly bound to the tin than are non-chelated surfactants. It is to be recognized, however, that a diamine chelating agent also bridge between two tin nanoparticles in some embodiments. When preparing tin nanoparticles via reduction of an insoluble tin complex, it is further believed that the diamine chelating agent can beneficially impede growth of large particles of the insoluble complex, ultimately resulting in the formation of tin nanoparticles having a small size range.

In some embodiments, suitable diamine chelating agents can include N,N'-dialkylethylenediamines, particularly C1-C4 N,N'-dialkylethylenediamines. The corresponding methylenediamine, propylenediamine, butylenediamine, pentylenediamine or hexylenediamine derivatives can also be used. The alkyl groups can be the same or different. C1-C4 alkyl groups that can be present include, for example, methyl, ethyl, propyl, and butyl groups, or branched alkyl groups such as isopropyl, isobutyl, s-butyl, and t-butyl groups. Illustrative N,N'-dialkylethylenediamines that can be suitable for use in the present embodiments include, for example, N,N'-di-t-butylethylenediamine, N,N'-diisopropylethylenediamine, and the like.

In some embodiments, suitable diamine chelating agents can include N,N,N',N'-tetraalkylethylenediamines, particularly C1-C4 N,N,N',N'-tetraalkylethylenediamines. The corresponding methylenediamine, propylenediamine, butylenediamine, pentylenediamine or hexylenediamine derivatives can also be used. The alkyl groups can again be the same or different and include those mentioned above. Illustrative N,N,N',N'-tetraalkylethylenediamines that can be suitable for use in the present embodiments include, for example, N,N,N',N'-tetramethylethylenediamine, N,N,N',N'-tetraethylethylenediamine, and the like.

As described above, suitable surfactants other than primary aliphatic amines can include, for example, pyridines, aromatic amines, phosphines, thiols, and any combination thereof. These surfactants can be used in combination with an aliphatic amine, including those described above, or they can be used in a surfactant system in which an aliphatic amine is not present.

Suitable aromatic amines can have a formula of $ArNR^1R^2$, where Ar is a substituted or unsubstituted aryl group and $R^1$ and $R^2$ are the same or different. $R^1$ and $R^2$ can be independently selected from H or an alkyl or aryl group containing from 1 to about 16 carbon atoms. Illustrative aromatic amines that can be suitable for use in the present embodiments include, for example, aniline, toluidine, anisidine, N,N-dimethylaniline, N,N-dimethylaniline, and the like. Other aromatic amines that can be used in conjunction with the embodiments described herein can be envisioned by one having ordinary skill in the art.

Suitable pyridines include both pyridine and its derivatives. Illustrative pyridines that can be suitable for use in the present embodiments include, for example, pyridine, 2-methylpyridine, 2,6-dimethylpyridine, collidine, pyridazine, and the like. Chelating amines such as bipyridyl chelating agents may also be used. Other pyridines that can be used in conjunction with the embodiments described herein can be envisioned by one having ordinary skill in the art.

Suitable phosphines can have a formula of $PR_3$, where R is an alkyl or aryl group containing from 1 to about 16 carbon atoms. The alkyl or aryl groups attached to the phosphorus center can be the same or different. Illustrative phosphines that can be used in the present embodiments include, for example, trimethylphosphine, triethylphosphine, tributylphophine, tri-t-butylphosphine, trioctylphosphine, triphenylphosphine, and the like. Phosphine oxides can also be used in a like manner. In some embodiments, surfactants that contain two or more phosphine groups configured for forming a chelate ring can also be used. Illustrative chelating phosphines can include 1,2-bisphosphines, 1,3-bisphosphines, and bis-phosphines such as BINAP, for example. Other phosphines that can be used in conjunction with the embodiments described herein can be envisioned by one having ordinary skill in the art.

Suitable thiols can have a formula of RSH, where R is an alkyl or aryl group having from about 4 to about 16 carbon atoms. Illustrative thiols that can be used in the present embodiments include, for example, butanethiol, 2-methyl-2-propanethiol, hexanethiol, octanethiol, benzenethiol, and the like. In some embodiments, surfactants that contain two or more thiol groups configured for forming a chelate ring can also be used. Illustrative chelating thiols can include, for example, 1,2-dithiols (e.g., 1,2-ethanethiol) and 1,3-dithiols (e.g., 1,3-propanethiol). Other thiols that can be used in conjunction with the embodiments described herein can be envisioned by one having ordinary skill in the art.

In some embodiments, methods for making tin nanoparticles can include reacting an insoluble tin complex with a reducing agent. The insoluble tin complex can be prepared in a reaction mixture containing a tin salt and one or more surfactants, including those described above. In some embodiments, methods for making tin nanoparticles can include forming a first solution containing a tin salt and one or more surfactants; allowing an insoluble complex of the tin salt to form from the first solution; combining a second solution containing a reducing agent with the insoluble complex; and forming tin nanoparticles from the insoluble complex.

In some embodiments, methods for making tin nanoparticles can include growing tin nanoparticles about insoluble nanoparticle seeds to form tin nanoparticles having a nucleus. In some embodiments, methods described herein can include combining a tin (II) salt and a metal salt in a solvent, the metal salt being soluble in the solvent and reducible by the tin (II) salt; reducing the metal salt with a first portion of the tin (II) salt to produce a tin (IV) salt and insoluble nanoparticle seeds formed from the metal salt; and reacting the tin (IV) salt, a second portion of the tin (II) salt, or any combination thereof with a reducing agent to form tin nanoparticles having a nucleus formed from a nanoparticle seed. In some embodiments, the tin nanoparticles can be formed in the presence of at least one surfactant, including those described above.

In some embodiments, the insoluble nanoparticle seeds can have a metal oxidation state of at least +1 after being reduced by the tin (II) salt. For example, in some embodiments, the metal salt can include a copper (II) salt and the insoluble nanoparticle seeds can include a copper (I) salt. Suitable copper (II) salts are not particularly limited and can include, for example, copper (II) chloride, copper (II) sulfate, copper (II) acetate, copper (II) nitrate, and the like. In other embodiments, the insoluble nanoparticle seeds can have a metal oxidation state of 0 after being reduced by the tin (II) salt. For example, in some embodiments, the metal salt can include a silver (I) salt, a gold (I) salt, or a gold (III) salt, and the insoluble nanoparticle seeds can include silver (0) or gold (0). Suitable silver (I), gold (I), and gold (III) salts that can be used to form insoluble nanoparticle seeds include, for example, silver (I) nitrate, gold (I) chloride, and gold (III) chloride. Of the foregoing metals, copper is particularly desirable for forming insoluble nanoparticle seeds due to the propensity for copper (I) to form a very finely divided precipitate upon reduction of copper (II). In addition, copper is inexpensive relative to gold and silver and does not add significantly to the costs associated with producing tin nanoparticles with a copper (I) nucleus. Moreover, copper (I) nanoparticle seeds can be reduced to a metallic state during deposition of a tin coating thereon in the presence of a reducing agent.

In general, only small quantities of insoluble nanoparticle seeds are needed to promote the formation of tin nanoparticles according to the methods described herein, since the insoluble nanoparticle seeds forming the nucleus constitute but a small fraction of the overall nanoparticle volume. Accordingly, when forming tin nanoparticles about an insoluble nanoparticle seed, less than a stoichiometric amount of the metal salt can be used relative to the tin (II) salt. In some embodiments, the metal salt (e.g., a copper (II) salt) can be present in an amount ranging between about 0.05 and about 0.25 stoichiometric equivalents relative to the tin (II) salt. It is to be recognized that higher or lower stoichiometric quantities of the metal salt that forms the nanoparticle seeds can be present, if desired. In some embodiments, an amount of the metal salt can range between about 0.01 and about 0.05 stoichiometric equivalents relative to the tin (II) salt. In other embodiments, an amount of the metal salt can range between about 0.2 equivalents and about 0.5 stoichiometric equivalents relative to the tin (II) salt, or between about 0.5 and about 1 stoichiometric equivalents relative to the tin (II) salt.

As described above, tin nanoparticles can be formed by reacting a reducing agent with a tin salt and/or an insoluble tin complex. Suitable reducing agents should be capable of reducing tin (II) and/or tin (IV) but are otherwise not believed to be particularly limited. In some embodiments, the reducing agent can be an alkali metal such as, for example, lithium, sodium, or potassium, in the presence of a suitable catalyst. In some embodiments, the reducing agent can be lithium naphthalide, sodium naphthalide, or potassium naphthalide. In other embodiments, the reducing agent can be sodium borohydride, lithium borohydride, tetraalkylammonium borohydrides, or a like borohydride reducing agent. In still other embodiments, the reducing agent can be ascorbic acid, citric acid, or hydroxylamine. Additional reducing agents suitable for use in conjunction with forming tin nanoparticles can be envisioned by one having ordinary skill in the art.

In general, tin nanoparticles can be formed in the presence of a small excess of the reducing agent. In various embodiments, up to about a 100% molar excess of the reducing agent can be used relative to the tin salt. In some embodiments, up to about a 25% molar excess or up to about a 10% molar excess of the reducing agent can be used relative to the tin salt. Lower amounts of the reducing agent can be used if the reaction mixture is maintained under dry conditions so as not to decompose excessive amounts of the reducing agent, particularly if a moisture-sensitive reducing agent is used. Higher excesses of the reducing agent can be used to drive the tin nanoparticle formation reaction to completion faster.

In some embodiments, the tin nanoparticles can be formed in a solvent that is substantially anhydrous (e.g., about 200 ppm water or lower). Suitable techniques for drying solvents will be familiar to one having ordinary skill in the art. In addition, in some embodiments, the insoluble tin complex and/or insoluble nanoparticle seeds can be formed in a first solvent, and the reducing agent used to form the tin nanoparticles can be in a second solvent, with the first solvent and the second solvent being combined to result in the formation of tin nanoparticles. The first solvent and the second solvent can be the same or different. Suitable solvents are set forth hereinbelow.

In some embodiments, the solvent in which the tin nanoparticles are formed can be an organic solvent, particularly any polar aprotic solvent that is capable of at least partially solubilizing a tin salt and a reducing agent. As described above, in some embodiments, the organic solvent can be substantially anhydrous. Further, in some embodiments, the organic solvent can be substantially oxygen free. Suitable organic solvents for solubilizing tin salts and forming tin nanoparticles can include, for example, formamide, N,N-dimethylformamide, dimethyl sulfoxide, dimethylpropylene urea, hexamethylphosphoramide, tetrahydrofuran, and methyl or ethyl ethers of glyme, diglyme, triglyme, and tetraglyme. Diglyme or triglyme can be particularly advantageous, since they readily dissolve a number of tin salts while also activating reducing agents such as sodium borohydride.

In other embodiments, water can be used as the solvent for forming the tin nanoparticles. In some embodiments, the water can be substantially oxygen free while forming the tin nanoparticles.

In some embodiments, the tin salt and/or the metal salt can be dried by methods such as, for example, heating under vacuum or reacting with a chemical drying agent such as, for example, an orthoester or thionyl chloride. Drying of the tin salt and/or the metal salt can help maintain the solvent in a substantially dry state in the event that an anhydrous solvent is used.

In various embodiments, the tin salt used for forming tin nanoparticles in the methods described herein can include, for example, tin (II) halides (e.g., stannous chloride), tin (II) nitrate, tin (II) acetate, tin (II) sulfate, tin (II) formate, tin (II) oxide, tin (II) hydroxide, and any combination thereof. Other tin (II) and/or tin (IV) salts can be used if forming an insoluble tin complex. If forming insoluble nanoparticle seeds via reduction, only the tin (II) salts can be used. One of ordinary skill in the art will recognize the benefits of choosing a tin salt having good solubility in the organic solvent being employed. Moreover, the choice of tin salt can be a function of cost and scale. For example, processes conducted on large scales can benefit from use of inexpensive tin halide salts, for example, including tin (II) chloride, tin (II) bromide, and tin (II) iodide.

In some embodiments, formation of the tin nanoparticles can take place in a reduction that occurs at a temperature below about 100° C., or below about 50° C. In some embodiments, formation of the tin nanoparticles can take place at a temperature ranging between about 0° C. and about 50° C., or between about 25° C. and about 50° C., or between about 30° C. and about 40° C. As one of ordinary skill in the art will appreciate, higher temperatures will generally facilitate the faster formation of tin nanoparticles. Further, one of ordinary skill in the art will appreciate that the size of the tin nanoparticles obtained may depend, at least in part, upon the temperature at which the tin nanoparticles are formed.

After combining the reducing agent with a reaction mixture containing tin, the reaction mixture can be monitored for signs of tin nanoparticle formation. These signs can include, for example, a change in color and/or gas evolution. Tin nanoparticle formation can also be monitored colorimetrically, photometrically, or potentiometrically, if desired.

Once a desired amount of reduction to form tin nanoparticles has taken place, the reaction can be stopped in various ways. In some embodiments, the reducing agent can be quenched with a terminating agent that is reactive with the reducing agent but not substantially reactive with the tin nanoparticles. Illustrative examples of terminating agents can include, for example, aldehydes, ketones, nitriles, organic acids, water, combinations thereof, and the like. More specific examples can include, for example, acetaldehyde, acetonitrile, formic acid, acetic acid, malic acid, and oxalic acid. One of ordinary skill in the art will recognize that by quenching the reducing agent, one can arrest the formation of tin nanoparticles. In some embodiments, the amount of the terminating agent can be chosen such that it is stoichiometrically equivalent with the amount of excess reducing agent. In some embodiments, surface oxidation of the tin nanoparticles can occur if excessive terminating agent is present.

In other embodiments, the formation of tin nanoparticles can be arrested by means other than or in combination with quenching of the reducing agent. For example, in some embodiments, the formation of tin nanoparticles can be arrested by cooling the reaction mixture to about $-10°$ C. or below (e.g., in a liquid nitrogen or dry ice bath), centrifuging the reaction mixture, or combinations thereof. One of ordinary skill in the art will recognize that in the former case, lowering of the reaction temperature to this degree will effectively stop the reduction process. In the latter case, centrifuging the tin nanoparticles can remove them from the reaction mixture in which the reducing agent is present, thereby separating the tin nanoparticles from the excess reducing agent. In some embodiments, centrifuging the tin nanoparticles can take place at a reduced temperature (e.g., below room temperature) so as to minimize the risk of nanoparticle fusion occurring during the centrifugation process. For example, in some embodiments, centrifugation can take place at a temperature ranging between about $-10°$ C. and about 15° C.

In some embodiments, the tin nanoparticles formed by the processes described herein can be used in situ without further isolation. In other embodiments, a work up of the reaction mixture can be performed to purify and isolate the tin nanoparticles. Isolation and purification of the tin nanoparticles can include a series of rinses, sonication, and centrifugation steps. After isolation of the tin nanoparticles from the reaction mixture, various purification processes can optionally be conducted. For example, after isolation of the tin nanoparticles by centrifugation, the mother liquor can be decanted, and the tin nanoparticles can be washed with glyme, THF, or a like solvent to remove excess reducing agent and potential organic side reaction products. Next, water washes can then be conducted until an $AgNO_3$ test of the wash water is negative for the presence of chloride, which typically takes about 2 to about 5 water washes. In some embodiments, aqueous ammonia washes of the tin nanoparticles can be conducted to remove any unreacted tin salt from the reaction mixture. In such embodiments, a ratio of about 1:4 to about 1:10 ammonia:water can most typically be used.

In some embodiments, after their preparation and isolation, the tin nanoparticles can be stored under conditions that facilitate their long term stability. In some embodiments, the tin nanoparticles can be stored under water or another solvent that contains an antioxidant such as, for example, citric acid, ascorbic acid, butylated hydroxyanisole (BHA), butylated hydroxytoluene (BHT), or propyl gallate (PG). In some embodiments, the tin nanoparticles can be stored under long chain hydrocarbons (e.g. mineral oil), high boiling petroleum ether and the like. In some embodiments, the metal nanoparticles can be stored by sealing a powder of tin nanoparticles with a wax layer and storing in a closed container. In some embodiments, the container housing the tin nanoparticles can be flushed with an inert gas such as nitrogen or argon before being sealed so as to further minimize the risk of oxidation during storage. In some embodiments, the storage container can be sealed with, for example, a wax layer, shrink wrap, tape, film, and the like.

In some embodiments, the metal nanoparticles can be dispersed in a material that prevents the tin nanoparticles from coming in contact with one another and optionally protects the tin nanoparticles from atmospheric oxygen during storage. Illustrative materials meeting these criteria can include, for example, waxes, long chain amines having greater than about 10 carbon atoms, paraffins, and aromatic compounds such as, for example, phenanthrene, pyrene, or anthracene.

In some embodiments, the tin nanoparticles can be mixed with an additive such that they have a desired consistency. For example, the tin nanoparticles can be formulated to produce the consistency of a gel, paste, paint or like material. In such embodiments, the tin nanoparticles can be formulated and readily applied to a surface. For example, in some embodiments, the tin nanoparticles can be used to form a connection on a surface (e.g., to join a first member to a second member). In some embodiments, the tin nanoparticles can be mixed with an additive such as, for example, dicyclohexylamine, paraffin wax, glycerin, or flux materials (e.g., formic acid, acetic acid, hexadecanoic acid, or triethanolamine) to attain a desired consistency. In some embodiments, small amounts of solvents such as, for example, ethanol, isopropanol, butanol, cyclohexanol, acetone, toluene and the like can be used to obtain a consistency suitable for ready application to a surface. In some embodiments, a solution or suspension of the tin nanoparticles can be partially evaporated to remove at least some of the solvent therefrom to attain a desired consistency. When formulated as a gel, paste, paint or the like, about 75% to about 98% tin nanoparticles by weight can be present, with the balance being solvent and/or additive used to attain the desired consistency In some embodiments, tin nanoparticles can be formulated into reworkable compositions that are resistant to the formation of tin whiskers. Such compositions are described in more detail in commonly owned U.S. patent application Ser. No. 13/040,207, previously incorporated herein by reference. In various embodiments, compositions containing tin nanoparticles can further contain electrically conductive particles and a whisker suppressant. In more specific embodiments, compositions containing tin nanoparticles can further contain copper particles and nickel and/or cobalt particles mixed with the tin nanoparticles. Further disclosure regarding such compositions that are resistant to tin whisker formation follows hereinafter.

In various embodiments, compositions described herein can contain at least about 30% tin nanoparticles by weight. In some embodiments, the compositions can contain about 30% to about 75% tin nanoparticles by weight, or about 30% to about 60% tin nanoparticles by weight, or about 30% to about 50% tin nanoparticles by weight, or about 50% to about 70% tin nanoparticles by weight, or about 40% to about 60% tin nanoparticles by weight.

In various embodiments, the compositions can contain a whisker suppressant in combination with the tin nanoparticles. In an embodiment, a whisker suppressant for tin can be lead. However, lead-based whisker suppression is not viable from a commercial standpoint based on the currently mandated phase out of lead. In other embodiments, a whisker suppressant for tin can be nickel particles and/or cobalt particles. Nickel particles are particularly compatible with tin nanoparticles and can suppress tin whisker formation without the undesirable environmental and health concerns presented by lead. When present, the whisker suppressant is typically used in an amount that is as low as feasible to effectively suppress tin whisker formation. For example, nickel particles and/or cobalt particles can be present in the compositions in an amount from about 1% to about 10% of the composition by weight, or from about 1% to about 5% of the composition by weight, or from about 3% to about 8% of the composition by weight.

In some embodiments, the compositions can contain electrically conductive particles such as copper particles. In various embodiments, the compositions described herein can contain at least about 10% copper by weight, or at least about 25% copper by weight, or at least about 30% copper by weight, or at least about 35% copper by weight, or at least about 40% copper by weight, or at least about 45% copper by weight, or at least about 50% copper by weight, or at least about 55% copper by weight, or at least about 60% copper by weight, or at least about 65% copper by weight. In some embodiments, the compositions can contain about 25% to about 65% copper by weight, or about 25% to about 60% copper by weight, or about 30% to about 65% copper by weight, or about 40% to about 60% copper by weight.

In general, the electrically conductive particles and the whisker suppressant are not required to be in the nanoparticle size range, although they are not precluded from doing so. In some embodiments, the copper particles, the nickel particles and/or cobalt particles, or any combination thereof can be greater than about 100 nm in size. In some embodiments, the copper particles, the nickel and/or cobalt particles, or any combination thereof can range from about 100 nm to about 50 μm in size. In some embodiments embodiments, the copper particles, the nickel and/or cobalt particles, or any combination thereof can range from about 100 nm to about 1 μm in size. In other various embodiments, the copper particles, the nickel and/or cobalt particles, or any combination thereof can be less than about 100 nm in size.

In some embodiments, the compositions described herein can further include additional components that are added to adjust the physical properties of the compositions. In some embodiments, the present compositions can further include at least one additional component such as, for example, silver, indium, antimony, aluminum or gallium. In some embodiments, the at least one additional component can collectively make up about 5% or less of the composition by weight. When two or more additional components are present, they can collectively make up about 5% or less of the composition by weight. In some embodiments, the at least one additional component can have a particle size of at least about 100 nm. However, the at least one additional component can be in nanoparticle form, if desired, in other embodiments.

As described above, tin nanoparticles can display fusion temperatures that are less than the melting point of bulk tin (e.g., 232° C.). After reaching their fusion temperature, the tin nanoparticles can become at least partially fused together. Depending on the heating time and temperature, among other factors, the tin nanoparticles can be completely fused together after heating to regenerate bulk tin. At shorter heating times or lower temperatures, however, the tin nanoparticles can become only partially fused together after heating. Once the tin nanoparticles have been at least partially fused together, the compositions described herein can be reworked at temperatures at or above the melting point of bulk tin.

When copper particles and nickel and/or cobalt particles are present in the compositions, particularly in non-nanoparticle form, they can have melting points that are much higher than that of the tin nanoparticles or bulk tin (copper m.p.=1083° C., nickel m.p.=1453° C., cobalt m.p.=1495° C.). Thus, the copper particles and the nickel and/or cobalt particles can remain substantially unaffected at the temperatures used to at least partially fuse the tin nanoparticles to one another. Although the copper particles and the nickel and/or cobalt particles do not themselves melt, they can become fused to the tin nanoparticles as the tin liquefies and then re-solidifies. Since the copper particles and the nickel and/or cobalt particles do not melt upon being heated, the formation of multi-element phases can be avoided, thereby keeping the melting point of the compositions at or below that of bulk tin.

In some embodiments, ink jet printing techniques can be used to place the tin nanoparticles in a desired location, such as in printed circuit board applications, for example. In some embodiments, the tin nanoparticles can become at least partially fused together due to pressures arising from the ink jet deposition process. In other embodiments, the tin nanoparticles can become at least partially fused together through heating. The heating can be applied before, during, or after the ink jet deposition process. For conformal coating application onto large areas, spray-on or brush-on techniques can be used, with heat being applied during or after tin nanoparticle deposition to affect tin nanoparticle coalescence.

In some embodiments, methods described herein can include providing a composition containing tin nanoparticles, the tin nanoparticles having a nucleus formed from a nanoparticle seed; and at least partially fusing the tin nanoparticles together. In some embodiments, the tin nanoparticles can be at least partially fused together by heating the tin nanoparticles above a fusion temperature of the tin nanoparticles. In some or other embodiments, the tin nanoparticles can be at least partially fused together by placing the tin nanoparticles under pressure. In some embodiments, the compositions can further contain electrically conductive particles (e.g., copper particles) and nickel and/or cobalt particles, where the copper particles and nickel and/or cobalt particles do not necessarily become liquefied while fusing the tin nanoparticles together.

In some embodiments, the compositions can be used to form a connection, which can be a physical, thermal, or electrical connection. Specifically, the connection can be formed by at least partially fusing the tin nanoparticles together. In some embodiments, forming a connection can further include joining a first member to a second member by at least partially fusing the tin nanoparticles together.

In further embodiments, connections formed by at least partially fusing tin nanoparticles together can be reworked. Specifically, in some embodiments, methods described herein can include heating the connection to at least partially liquefy the composition, and disconnecting the first member from the second member. For example, in some embodiments, it can be desirable to rework a connection to replace a failed component therein. In still further embodiments, the methods can further include adding a replacement member to the connection and re-solidifying the composition. Generally, the rework temperature is at or above that of the melting point of bulk tin.

Figure 5:
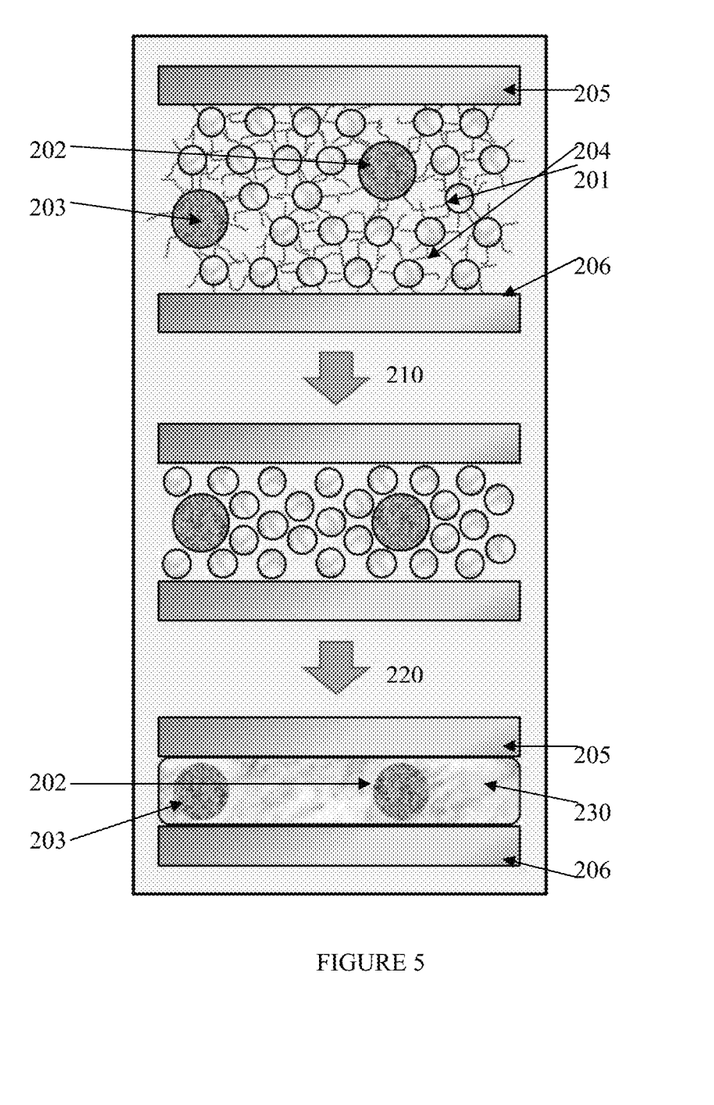
FIG. 5 shows an illustrative schematic demonstrating the joining of a first member to a second member using tin nanoparticles.

Methods for forming and reworking a connection will now be described with further reference to the drawings. FIG. 5 shows an illustrative schematic demonstrating the joining of a first member to a second member using tin nanoparticles. Tin nanoparticles 201 containing surfactants 204 thereon can be mixed with copper particles 202 and nickel particles 203 and placed between first member 205 and second member 206. Heat can then be applied in operation 210 to drive off surfactants 204. Continued heating in operation 220 can result in fusion of tin nanoparticles 201 to each other and to copper particles 202 and nickel particles 203 to form a consolidated structure 230 joining first member 205 to second member 206. The nucleus within tin nanoparticles 201 has been omitted for purposes of clarity. Had the nucleus been depicted in FIG. 5, however, there would have been a plurality of nuclei distributed in consolidated structure 230 arising from each tin nanoparticle 201. Rework of the connection established by consolidated structure 230 can be accomplished by heating to at least partially liquefy the tin present therein, thereby allowing first member 205 and second member 206 to be separated from one another.

Tin nanoparticles and compositions derived therefrom can be used in a variety of articles and applications including, for example, printed circuit boards (PCBs), conformal coatings, thin film solar cell contacts, batteries (e.g., Li-ion batteries), extreme UV (EUV) lithography devices, thermoelectric materials (e.g., $Mg_2Si/Ge/Sn$), gas sensors, and conductive inks. These articles can be used in both consumer electronic devices, including handheld and mobile devices, and specialty high performance applications including, for example, automotive, space and military vehicles, medical devices, high temperature/pressure equipment such as that used in oil and gas exploration and production, and low temperature brazing for refrigeration and air conditioning applications. In various embodiments, the compositions described herein can protect contact pads from oxidation without substantial danger of tin whisker growth while providing enhanced conductivity. In addition, the residual nanostructure of the tin nanoparticles can provide stronger joints and higher surface area, which can be beneficial in many applications.

Figure 6:
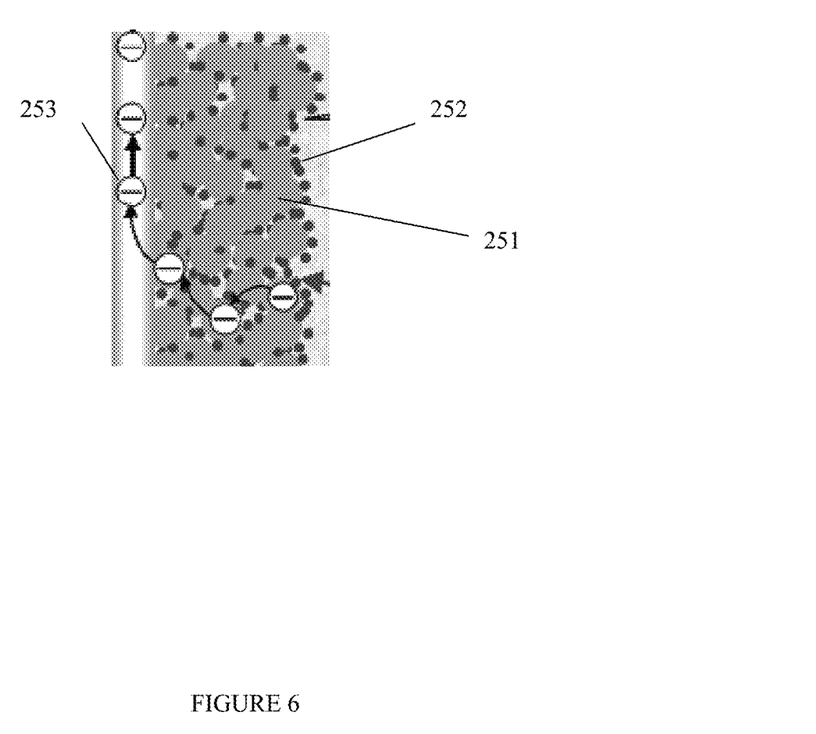
FIG. 6 shows a schematic of an illustrative porous carbon body containing tin nanoparticles admixed therewith.

In some embodiments, compositions containing tin nanoparticles can further include a porous carbon body in contact with the tin nanoparticles. The porous carbon body can include, for example, carbon nanotubes, graphene, carbon fibers, or any combination thereof, thereby producing a high surface area conductive material and impregnated with tin nanoparticles. In various embodiments, the tin nanoparticles can at least partially cover the surface of the porous carbon body. Such porous carbon bodies containing impregnated tin nanoparticles can be used as electrodes for batteries, especially Li-ion batteries. In battery applications, the porous carbon body containing impregnated tin nanoparticles can provide more power per unit weight, increased discharge cycles, and longer life than current technologies. These advantages can be realized due to the high surface area that allows more electrons to exchange per unit time. Moreover, such structures can participate in charge/discharge cycles without cracking while incorporating and releasing lithium ions. In addition, thin films of such structures can also be produced. FIG. 6 shows a schematic of an illustrative porous carbon body 251 containing tin nanoparticles 252 admixed therewith. Movement of negative charge 253 through porous carbon body 251 is presented for purposes of illustration.

In some embodiments, tin nanoparticles or compositions containing tin nanoparticles can be used in batteries, particularly Li-ion batteries. In Li-ion batteries, the anode swells when taking up lithium as the battery charges and discharges. By incorporating tin nanoparticles into the anode of a Li-ion battery, the battery's performance can be improved by increasing the anode's surface area and improving the battery's life by reducing stresses that take place when the anode swells during lithium ion uptake. At the nanoscale, it is believed that swelling and shrinkage does not cause cracking and allows many charge/discharge cycles to take place without degradation.

Continued miniaturization in microelectronics has necessitated shorter wavelength tools to meet the next generation of sub-100 nm nodes. One way that has been proposed to accomplish the foregoing is the use of EUV sources for next generation photolithography. EUV is typically considered to encompass a wavelength range from about 121 nm to about 10 nm. Current research focus in EUV photolithography has been centered upon tin sources that are evaporated with a high power laser source, which generates EUV rays from the vaporized tin ions. If the tin source is not sufficiently small, not all of the tin will ionize and produce EUV rays. Previous approaches to solve this problem have involved use of tin films or tin-coated microspheres; however, these approaches still produce a significant amount of non-ionized tin atoms and they are difficult to form from bulk tin. In some embodiments, tin nanoparticles can be used in EUV applications, which can allow improved ionization efficiency of the tin to be realized.

In some embodiments, methods described herein can include providing tin nanoparticles; at least partially vaporizing the tin nanoparticles, thereby producing vaporized tin ions; and generating an emission of EUV radiation from the vaporized tin ions. In some embodiments, the tin nanoparticles used in conjunction with generating an EUV emission can include a nucleus formed from an insoluble nanoparticle seed. In some or other embodiments, the tin nanoparticles used in conjunction with generating an EUV emission can lack a nucleus.

In some embodiments, conductive inks can contain tin nanoparticles or compositions containing tin nanoparticles. In some embodiments, the inks can contain a solvent and/or other optional binder materials. In addition, any component that is used in a conventional ink can be utilized as well. Advantages of inks containing tin nanoparticles or compositions containing tin nanoparticles are that high resolution printing and inscribing can take place through techniques that are not currently possible with micron-size materials. In addition, the pressure from the ink application can lead to at least partial nanoparticle fusion to set the inks and to produce a conductive tin trace. That is, the inks can be set without heating, if desired. Moreover, such inks can provide good oxidation resistance without the application of additional coatings.

In some embodiments, tin nanoparticles or compositions containing tin nanoparticles can be used in gas sensors. In conventional gas sensors, $SnO_2$ can be used as a thin film over interdigitated electrodes which can show a change in resistance with increasing exposure to analytes, particularly gas analytes. In some embodiments, inks containing tin nanoparticles or compositions containing tin nanoparticles can used to draw a sensor array. After annealing under oxygen, a thin film of $SnO_2$ can form a gas sensor in a very versatile and low cost process. In alternative embodiments, tin nanoparticles can be used to form a coating of $SnO_2$ on a conventional gas sensor.

EXAMPLES

Tin nanoparticle syntheses were carried out under inert gas atmosphere, and all solvents and surfactants were degassed with dry argon or nitrogen gas for 5 minutes before use.

Example 1

40 ml of water was placed into a 100 mL 3 neck round bottom flask, which was then evacuated and backfilled with argon three times. Thereafter, 0.5 g of copper (II) chloride dihydrate was added, and the mixture was stirred for 30 minutes at room temperature until completely dissolved. A 50 mL aqueous solution containing 2.5 g of tin (II) chloride dihydrate was then added rapidly to the copper (II) chloride solution. The reaction mixture turned opaque immediately due to the formation of copper (I) chloride seeds (see FIG. 1). To the copper (I) chloride seeds, the following surfactants were added under positive argon pressure: 2 mL of n-butylamine and 3 mL of pyridine.

A 50 mL round bottom flask was charged with 12 mL of basic (0.5 mL n-butylamine) 2.0 M sodium borohydride solution. While keeping both flasks at room temperature, the sodium borohydride solution was transferred to the flask containing the copper (I) chloride seeds over no more than 30 seconds using a cannula. The reaction mixture immediately turned black and evolved gas. Once the reaction was complete, as evidenced by the cessation of gas evolution, the reaction mixture was cooled to 0° C. in an ice bath for 10 minutes. The reaction mixture was centrifuged at 2200 RPM for 10 minutes, resulting in a black precipitate and a clear supernatant. The black precipitate was washed with a dicyclohexylamine (4 mL)/water mixture (40 mL). The mixture was again centrifuged at 2200 RPM for 10 minutes, resulting in a black to grey precipitate and clear supernatant. The solid was then stored in a closed container under argon.

Example 2

75 mL of triglyme was placed in a 100 mL 3-neck round bottom flask, which was then evacuated and backfilled with argon three times. Thereafter, 0.5 g of anhydrous copper (II) chloride was added, followed by the following surfactants under positive argon pressure: 2 mL of n-butylamine and 3 mL of pyridine. The reaction mixture was stirred for 1 hour at 45° C. until the solids were completely dissolved. Thereafter, 2.5 g of $SnCl_4$ was added, followed rapidly by 20 mL of a triglyme solution containing 0.5 g of dissolved glucose. The reaction mixture turned opaque due to the formation of the nanoparticle seeds.

A 50 mL round bottom flask was charged with 25 mL of dry 2.0 M sodium borohydride solution in triglyme. While keeping both flasks at 45° C., the sodium borohydride solution was transferred to the flask containing the seeded tin (IV) chloride solution over no more than 30 seconds using a cannula. The reaction mixture immediately turned black and evolved gas. Once the reaction was complete, as evidenced by the cessation of gas evolution, the reaction mixture was cooled to 0° C. in an ice bath for 10 minutes. The reaction mixture was centrifuged at 2200 RPM for 10 minutes, resulting in a black precipitate and a clear supernatant. The black precipitate was washed with a dicyclohexylamine (4 mL)/water mixture (40 mL). The mixture was again centrifuged at 2200 RPM for 10 minutes, resulting in a black to grey precipitate and clear supernatant. The solid was then stored in a closed container under argon.

Although the invention has been described with reference to the disclosed embodiments, those skilled in the art will readily appreciate that these only illustrative of the invention. It should be understood that various modifications can be made without departing from the spirit of the invention. The invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description.

What is claimed is the following:

1. A method comprising:
   providing nanoparticles having a tin coating surrounding a nucleus, wherein the nucleus is formed from an insoluble nanoparticle seed, and the nanoparticles comprise at least one surfactant;
   at least partially vaporizing the nanoparticles, thereby producing vaporized tin ions; and
   generating an emission of extreme ultraviolet (EUV) radiation from the vaporized tin ions.

2. The method of claim 1, wherein the at least one surfactant comprises at least one aliphatic phosphine.

3. The method of claim 2, wherein the at least one surfactant further comprises an aliphatic amine, or a combination of an aliphatic amine and an aromatic amine.

4. The method of claim 1, wherein the nanoparticles range from about 0.5 nm to about 7 nm in size.

5. A method comprising:
providing nanoparticles having a tin coating surrounding a nucleus, wherein the nanoparticles comprise at least one surfactant;
at least partially vaporizing the nanoparticles, thereby producing vaporized tin ions; and
generating an emission of extreme ultraviolet (EUV) radiation from the vaporized tin ions.

6. The method of claim 5, wherein the at least one surfactant comprises at least one aliphatic phosphine.

7. The method of claim 6, wherein the at least one surfactant further comprises an aliphatic amine, or a combination of an aliphatic amine and an aromatic amine.

* * * * *